United States Patent
Boyd et al.

(10) Patent No.: US 7,280,111 B2
(45) Date of Patent: Oct. 9, 2007

(54) API COMMUNICATIONS FOR VERTEX AND PIXEL SHADERS

(75) Inventors: Charles F. Boyd, Woodinville, WA (US); Michael A. Toelle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 10/981,963

(22) Filed: Nov. 5, 2004

(65) Prior Publication Data

US 2005/0140669 A1   Jun. 30, 2005

Related U.S. Application Data

(63) Continuation of application No. 09/801,079, filed on Mar. 6, 2001, now Pat. No. 6,819,325.

(60) Provisional application No. 60/187,535, filed on Mar. 7, 2000.

(51) Int. Cl.
*G09G 5/36* (2006.01)
*G09G 5/37* (2006.01)
*G06F 13/00* (2006.01)
*G06T 15/60* (2006.01)
*G06T 15/00* (2006.01)

(52) U.S. Cl. ............ 345/559; 345/561; 345/538; 345/426; 345/522

(58) Field of Classification Search ........... 345/559, 345/561, 538, 426, 522
See application file for complete search history.

(56) References Cited

U.S. PATENT DOCUMENTS 6,452,595 B1 * 9/2002 Montrym et al. ........... 345/426
6,525,737 B1 * 2/2003 Duluk et al. ................ 345/506

* cited by examiner

*Primary Examiner*—Kee M. Tung
*Assistant Examiner*—Hau H Nguyen
(74) *Attorney, Agent, or Firm*—Woodcock Washburn LLP

(57) ABSTRACT

A three-dimensional API for communicating with hardware implementations of vertex shaders and pixel shaders having local registers. With respect to vertex shaders, API communications are provided that may make use of an on-chip register index and API communications are also provided for a specialized function, implemented on-chip at a register level, that outputs the fractional portion(s) of input(s). With respect to pixel shaders, API communications are provided for a specialized function, implemented on-chip at a register level, that performs a linear interpolation function and API communications are provided for specialized modifiers, also implemented on-chip at a register level, that perform modification functions including negating, complementing, remapping, stick biasing, scaling and saturating. Advantageously, these API communications expose these very useful on-chip graphical algorithmic elements to a developer while hiding the details of the operation of the vertex shader and pixel shader chips from the developer.

20 Claims, 8 Drawing Sheets

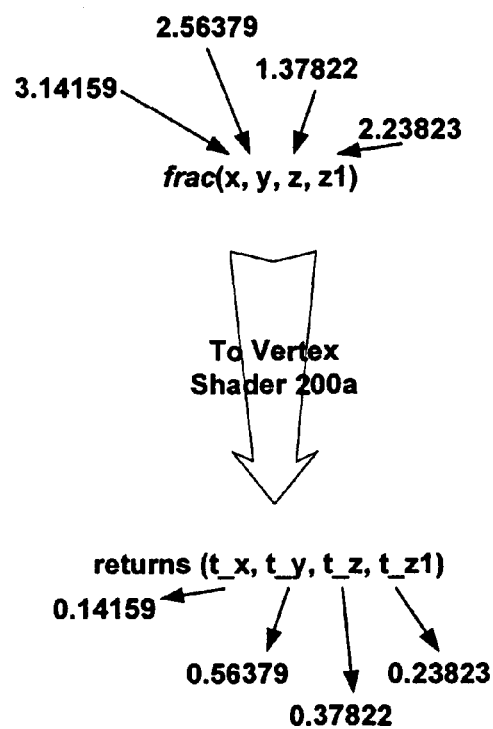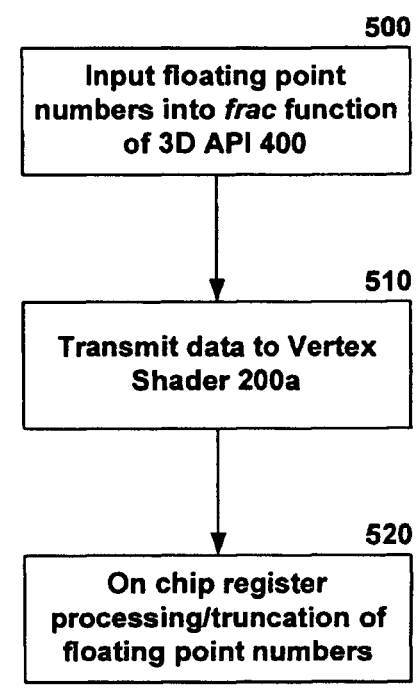
FIG. 5A  FIG. 5B

| Modifier | Function |
|---|---|
| M1 | -s1 (negator) |
| M2 | 1-s1 (Complement) |
| M3 | -bx2 (Remap) |
| M4 | -bias (Stick Bias) |
| M5 | -sat (Saturation) |
| M6 | -x2 (Scale by 2) |
| M7 | -x4 (Scale by 4) |
| M8 | -d2 (divide by 2) |

API COMMUNICATIONS FOR VERTEX AND PIXEL SHADERS

CROSS REFERENCE TO RELATED APPLICATION

This application is a continuation of U.S. patent application Ser. No. 09/801,079 filed Mar. 6, 2001, now U.S. Pat. No. 6,819,325, entitled "API Communications for Vertex and Pixel Shaders", which claims priority to U.S. Provisional Patent Application No. 60/187,535, filed Mar. 7, 2000 and are herein incorporated by reference in their entirety.

FIELD OF THE INVENTION

The present invention is directed to a three dimensional (3-D) graphics application programming interface (API) that provides new and improved methods and techniques for communications between application developers and procedural shaders, such as vertex and pixel shaders.

BACKGROUND OF THE INVENTION

Computer systems are commonly used for displaying graphical objects on a display screen. The purpose of three dimensional (3-D) computer graphics is to create a two-dimensional (2-D) image on a computer screen that realistically represents an object or objects in three dimensions. In the real world, objects occupy three dimensions. They have a real height, a real width and a real depth. A photograph is an example of a 2-D representation of a 3-D space. 3-D computer graphics are like a photograph in that they represent a 3-D world on the 2-D space of a computer screen.

Images created with 3-D computer graphics are used in a wide range of applications from video entertainment games to aircraft flight simulators, to portray in a realistic manner an individual's view of a scene at a given point in time. Well-known examples of 3-D computer graphics include special effects in Hollywood films such as Terminator II, Jurassic Park, Toy Story and the like.

One industry that has seen a particularly tremendous amount of growth in the last few years is the computer game industry. The current generation of computer games is moving to 3-D graphics in an ever increasing fashion. At the same time, the speed of play is driven faster and faster. This combination has fueled a genuine need for the rapid rendering of 3-D graphics in relatively inexpensive systems.

Rendering and displaying 3-D graphics typically involves many calculations and computations. For example, to render a 3-D object, a set of coordinate points or vertices that define the object to be rendered must be formed. Vertices can be joined to form polygons that define the surface of the object to be rendered and displayed. Once the vertices that define an object are formed, the vertices must be transformed from an object or model frame of reference to a world frame of reference and finally to 2-D coordinates that can be displayed on a flat display device, such as a monitor. Along the way, vertices may be rotated, scaled, eliminated or clipped because they fall outside of a viewable area, lit by various lighting schemes and sources, colorized, and so forth. The processes involved in rendering and displaying a 3-D object can be computationally intensive and may involve a large number of vertices.

To create a 3-D computer graphical representation, the first step is to represent the objects to be depicted as mathematical models within the computer. 3-D models are made up of geometric points within a coordinate system consisting of an x, y and z axis; these axes correspond to width, height, and depth respectively. Objects are defined by a series of points, called vertices. The location of a point, or vertex, is defined by its x, y and z coordinates. When three or more of these points are connected, a polygon is formed. The simplest polygon is a triangle.

3-D shapes are created by connecting a number of 2-D polygons. Curved surfaces are represented by connecting many small polygons. The view of a 3-D shape composed of polygon outlines is called a wire frame view. In sum, the computer creates 3-D objects by connecting a number of 2-D polygons. Before the 3-D object is ultimately rendered on a 2-D display screen, however, the data of sophisticated graphics objects undergoes many different mathematical transformations that implicate considerably specialized equations and processing unique to 3-D representation.

As early as the 1970s, 3-D rendering systems were able to describe the "appearance" of objects according to parameters. These and later methods provide for the parameterization of the perceived color of an object based on the position and orientation of its surface and the light sources illuminating it. In so doing, the appearance of the object is calculated therefrom. Parameters further include values such as diffuse color, the specular reflection coefficient, the specular color, the reflectivity, and the transparency of the material of the object. Such parameters are globally referred to as the shading parameters of the object.

Early systems could only ascribe a single value to shading parameters and hence they remained constant and uniform across the entire surface of the object. Later systems allowed for the use of non-uniform parameters (transparency for instance) which might have different values over different parts of the object. Two prominent and distinct techniques have been used to describe the values taken by these non-uniform parameters on the various parts of the object's surface: procedural shading and texture mapping. Texture mapping is pixel based and resolution dependent.

Procedural shading describes the appearance of a material at any point of a 1-D, 2-D or 3-D space by defining a function (often called the procedural shader) in this space into shading parameter space. The object is "immersed" in the original 1-D, 2-D or 3-D space and the values of the shading parameters at a given point of the surface of the object are defined as a result of the procedural shading function at this point. For instance, procedural shaders that approximate appearance of wood, marble or other natural materials have been developed and can be found in the literature.

The rendering of graphics data in a computer system is a collection of resource intensive processes. The process of shading i.e., the process of performing complex techniques upon set(s) of specialized graphics data structures, used to determine values for certain primitives, such as color, etc. associated with the graphics data structures, exemplifies such a computation intensive and complex process. For each application developer to design these shading techniques for each program developed and/or to design each program for potentially varying third party graphics hardware would be a Herculean task, and would produce much inconsistency.

Consequently, generally the process of shading has been normalized to some degree. By passing source code designed to work with a shader into an application, a shader becomes an object that the application may create/utilize in order to facilitate the efficient drawing of complex video graphics. Vertex shaders and pixel shaders are examples of such shaders.

Prior to their current implementation in specialized hardware chips, vertex and pixel shaders were sometimes implemented wholly or mostly as software code, and sometimes implemented as a combination of more rigid pieces of hardware with software for controlling the hardware. These implementations frequently contained a CPU or emulated the existence of one using the system's CPU. For example, the hardware implementations directly integrated a CPU chip into their design to perform the processing functionality required of shading tasks. While a CPU adds a lot of flexibility to the shading process because of the range of functionality that a standard processing chip offers, the incorporation of a CPU adds overhead to the specialized shading process. Without today's hardware state of the art, however, there was little choice.

Today, though, existing advances in hardware technology have facilitated the ability to move functionality previously implemented in software into specialized hardware. As a result, today's pixel and vertex shaders are implemented as specialized and programmable hardware chips. Exemplary hardware designs of vertex and pixel shader chips are shown in FIGS. 1A and 1B, and are described later in more detail. These vertex and pixel shader chips are highly specialized and thus do not behave as CPU hardware implementations of the past did.

Thus, a need has arisen for a 3-D graphics API that exposes the specialized functionality of today's vertex and pixel shaders. In particular, since present vertex shaders are being implemented with a previously unheard of one hundred registers, it would be advantageous to have a register index for indexing the registers of the vertex shader. Also, since realistic simulations require the precision of floating point numbers, it would be advantageous to provide specialized vertex shading functionality with respect to the floating point numbers at a register level. For example, it would be desirable to implement an instruction set that causes the extremely fast vertex shader to return only the fractional portion of floating point numbers. Similarly, with respect to pixel shaders, it would be desirable to provide specialized pixel shading functionality as well. More particularly, it would be desirable to provide a function that performs a linear interpolation mechanism. Furthermore, it would be desirable to use operation modifiers in connection with an instruction set tailored to pixel shaders. For example, negating, remapping, biasing, and other functionality would be extremely useful for many graphics applications for which efficient pixel shading is desirable, yet as they are executed as part of a single instruction they are best expressed as modifiers to that instruction. In short, the above functionality would be advantageous for a lot of graphics operations, and their functional incorporation into already specialized pixel and vertex shader sets of instructions would add tremendous value from the perspective of ease of development and improved performance.

SUMMARY OF THE INVENTION

In view of the foregoing, the present invention provides a three-dimensional (3-D) API for communicating with hardware implementations of vertex shaders and pixel shaders having local registers. With respect to vertex shaders, API communications are provided that may make use of an on-chip register index and API communications are also provided for a specialized function, implemented on-chip at a register level, which outputs the fractional portion(s) of input(s). With respect to pixel shaders, API communications are provided for a specialized function, implemented on-chip at a register level, that performs a linear interpolation function and API communications are provided for specialized modifiers, also implemented on-chip at a register level, that perform modification functions including negating, complementing, remapping, biasing, scaling and saturating. Advantageously, the API communications of the present invention expose very useful on-chip graphical algorithmic elements to a developer while hiding the details of the operation of the vertex shader and pixel shader chips from the developer.

Other features of the present invention are described below.

BRIEF DESCRIPTION OF THE DRAWINGS

The system and methods for network data replication are further described with reference to the accompanying drawings in which:

FIG. 5A is a diagram illustrating exemplary communications of a frac instruction to a vertex shader 200a in accordance with the present invention;

FIG. 5B is a block diagram illustrating an exemplary technique for taking the fractional portion of floating point numbers implemented in connection with a hardware vertex shader in accordance with the present invention;

DETAILED DESCRIPTION OF PREFERRED EMBODIMENTS

Overview

The present invention provides a 3-D graphics application programming interface (API) enabling software applications to control hardware in a way that is intuitive to software designers. This new method represents the hardware registers that control fixed function logic as a set of procedural instructions. This enables it to provide a consistent programming model for fixed-function hardware as well as for hardware that actually supports programmability.

The present invention provides a 3-D graphics application programming interface (API) providing new and improved methods and techniques for communications between application developers and 3-D hardware such as vertex and pixel shaders.

As related in the background, the specialized nature of today's graphics requirements creates a need for improved interfaces that can easily and efficiently exploit the ultra high performance characteristics of 3-D chips. One aspect of the 3-D API of the present invention is the incorporation of sophisticated programmable shading capabilities via "programmable shaders". In this current model, there are two programmable shaders defined: vertex shaders and pixel shaders. Programmable vertex shaders can be used for operations such as complex environment mapping, procedural geometry such as displacement meshes, and enhanced matrix palette skinning which enables more realistic characters e.g., by making knees look like knees when the leg bends, rather than having the leg appear as a rigid collection of line segments. Programmable pixel shaders also enable a number of interesting graphical effects such as true reflective bump mapping, a variety of per-pixel lighting algorithms, including distributed light sources, and special effects. This opens up the possibility of hardware-accelerated procedural textures i.e., textures that are calculated, rather than stored as bitmaps. The present invention fills a gap with respect to interfacing with a hardware programmable pixel shader. The 3-D API of the present invention thus delivers 3-D programmers or developers the performance equivalent of register-level access to the hardware on a high performance graphics card without having to know the internal specifications of the card. While at the same time presenting complex hardware to the developer as a small processor (ALU), a paradigm that all software developers work with daily. The present invention was thus developed in an effort to ease these types of tasks via a 3-D graphics API in view of the sophisticated nature of today's game's rendering quality requirements.

Figure 1A:
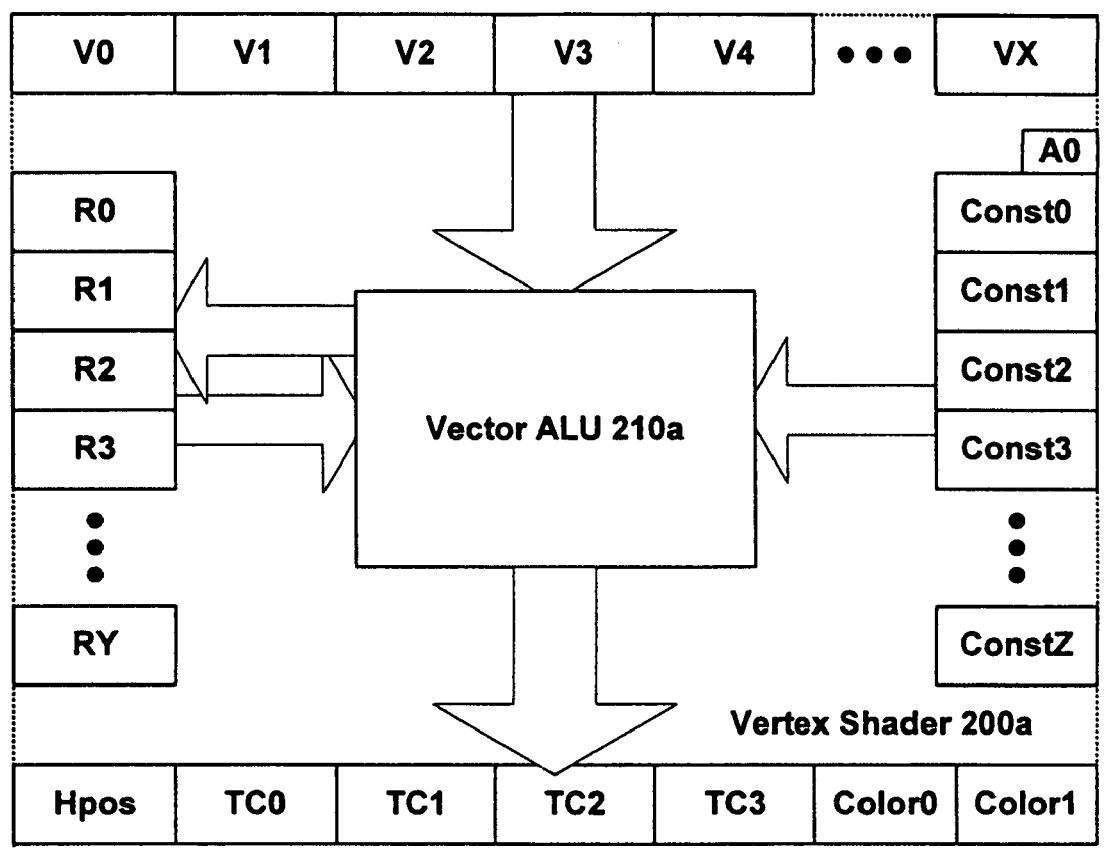
FIG. 1A is a block diagram representing an exemplary vertex shader design in connection with which the invention may be implemented.
Figure 1B:
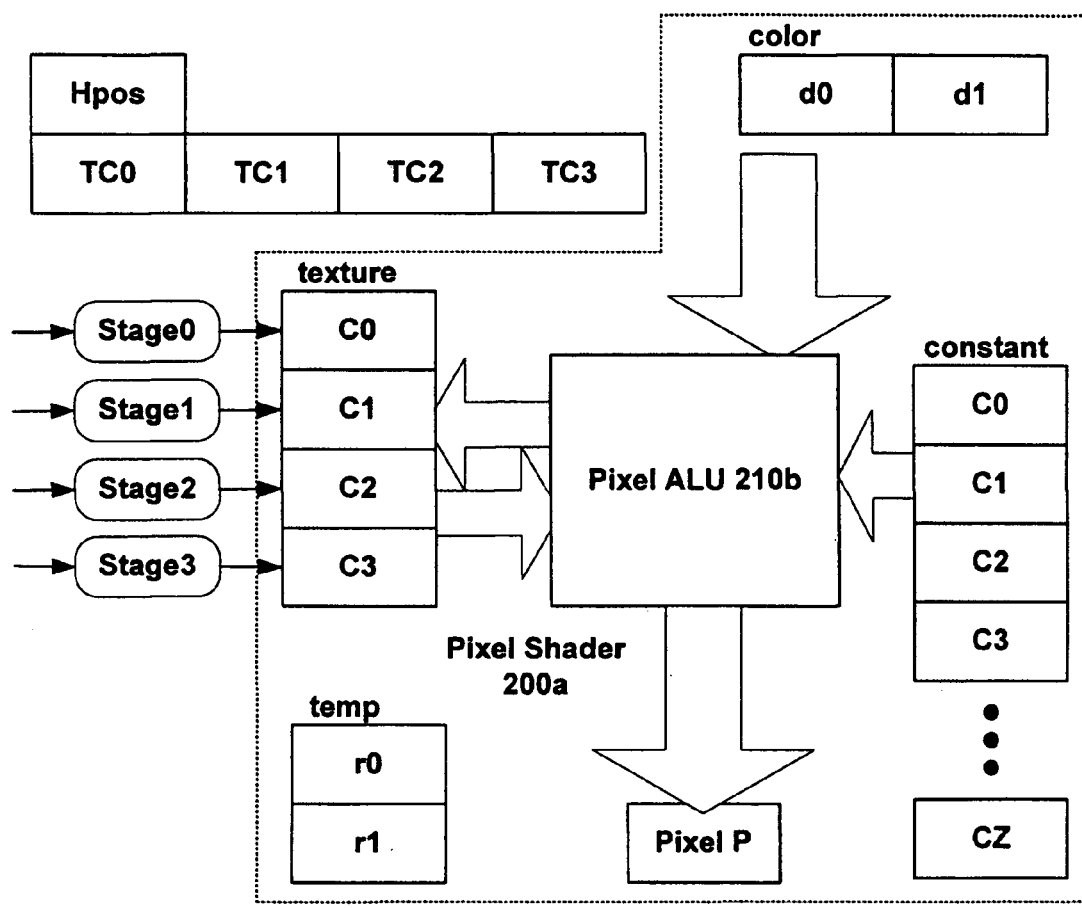
FIG. 1B is a block diagram representing an exemplary pixel shader design in connection with which the invention may be implemented.

FIGS. 1A and 1B illustrate, in more detail, exemplary modern hardware procedural shader architectures. FIG. 1A illustrates an exemplary vertex shader 200a having an arithmetic/logic unit (ALU) 210a, vertex data inputs V0 through VX, registers R0 through RY, constant registers Const0 through ConstZ and the various outputs Hpos, TC0 through TC3, Color0 and Color1. FIG. 1B illustrates an exemplary pixel shader 200b having an ALU 210b, inputs (outputs from vertex shader 200a) such as Hpos, TC0 through TC3 and color inputs d0 and d1. Pixel shader 200b includes texture registers t1 to t3, constant registers C0 through CZ, temp registers r0 and r1 and output pixel value P. To fully realize these capabilities, however, there is a need for an efficient API placed between a developer and modern hardware procedural shaders 200 having high performance local register processing and storage, wherein the API leverages the on-chip characteristics and possible new techniques, while hiding the details of graphics board operation from the developer.

Exemplary Computer and Network Environments

Figure 2:
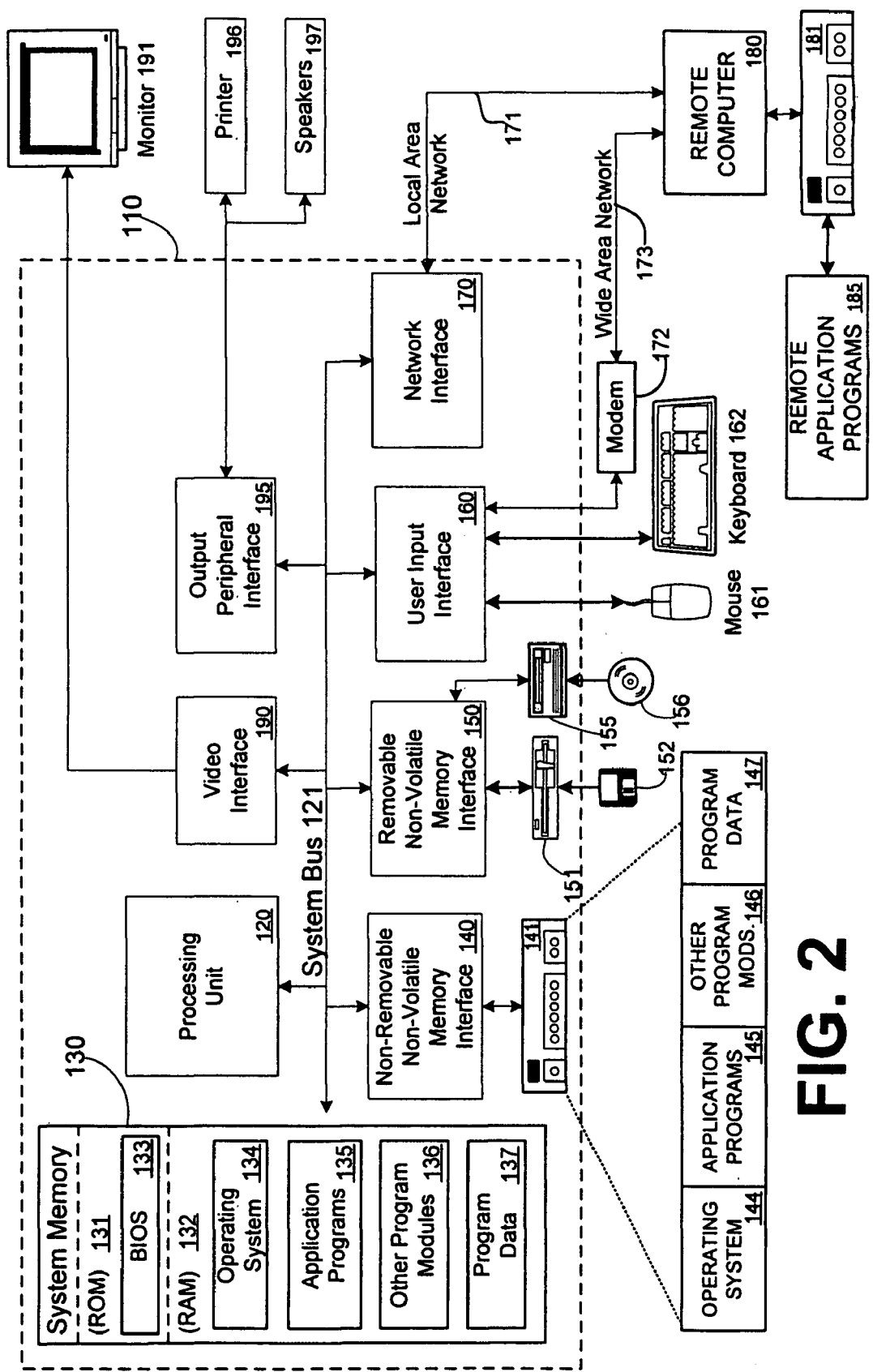
FIG. 2 is a block diagram representing a suitable computing system environment in which the present invention may be implemented.

FIG. 2 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, gaming platforms and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 illustrates an example of a suitable computing system environment 100 in which the invention may be implemented. The computing system environment 100 is only one example of a suitable computing environment and is not intended to suggest any limitation as to the scope of use or functionality of the invention. For example, graphics application programming interfaces may be useful in a wide range of platforms. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer-readable media. Computer-readable media can be any available media that can be accessed by computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer-readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
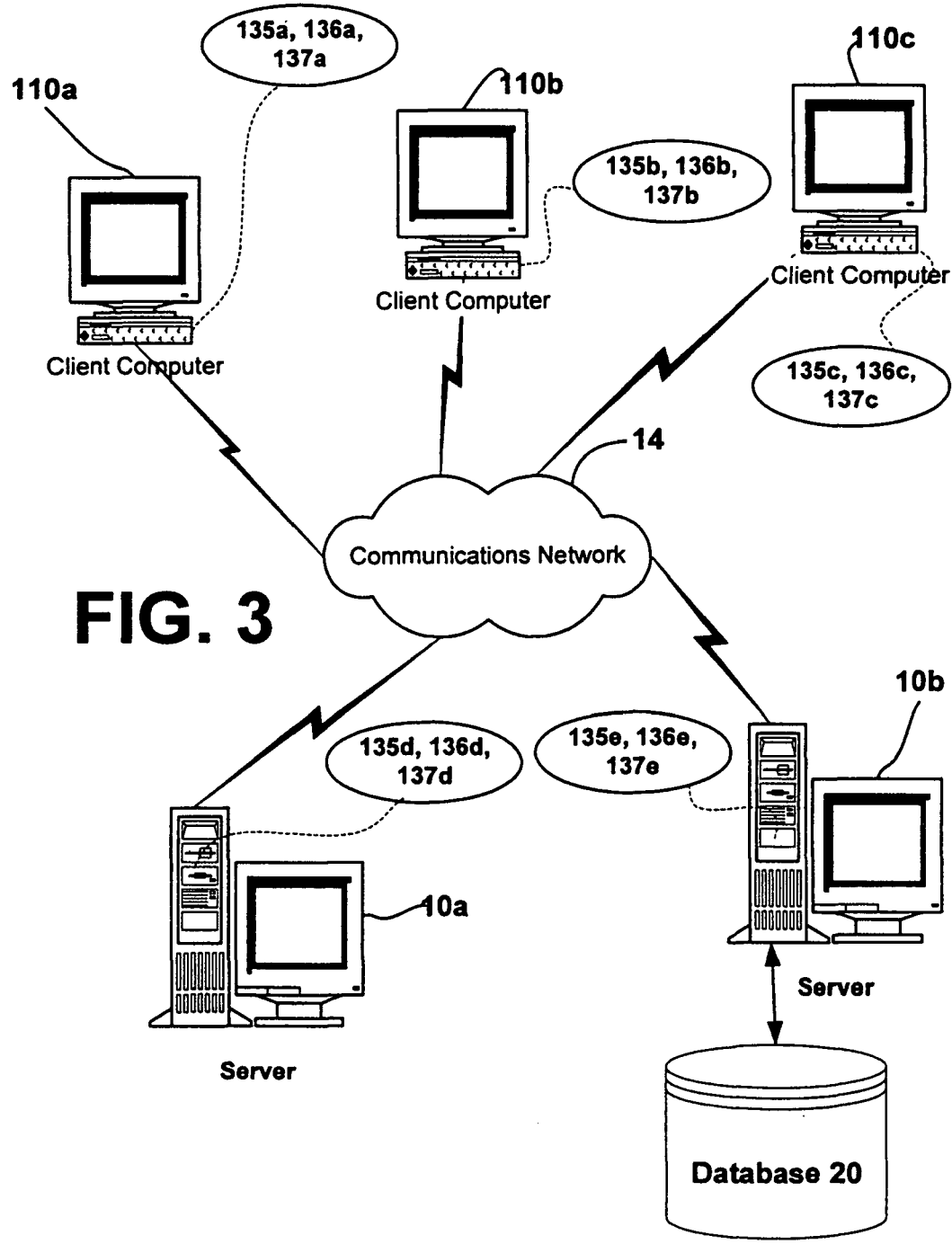
FIG. 3 is a block diagram representing an exemplary network environment in which the present invention may be implemented.

As mentioned, a computer, such as described above, can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage. More and more, graphics applications are becoming deployed in network environments. FIG. 3 thus illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, servers 10 can be Web servers with which the clients 110a, 110b, etc. communicate via any of a number of known protocols such as hypertext transfer protocol (HTTP). The invention may also leverage peer to peer networking techniques. Each client computer 110 and server computer 10 may be equipped with various application program modules 135, other program modules 136 and program data 137, and with connections or access to various types of storage elements or objects, across which files may be stored or to which portion(s) of files may be downloaded or migrated. Each client computer 110 and server computer 10 may also be connected to additional storage elements 20, such as a database. Thus, the present invention can be utilized in a computer network environment having client computers for accessing and interacting with a network and server computers 10a, 10b, etc. for interacting with client computers.

API for Vertex and Pixel Shaders

The present invention provides software application programming interfaces (APIs) for use in connection with the architectures for the specialized hardware implementations of today's vertex and pixel shaders, respectively. Pixel and vertex shaders give a more realistic and higher quality end result. The present invention is directed to an API that incorporates the features and power of the advanced rendering techniques of pixel and vertex shaders.

Figure 4:
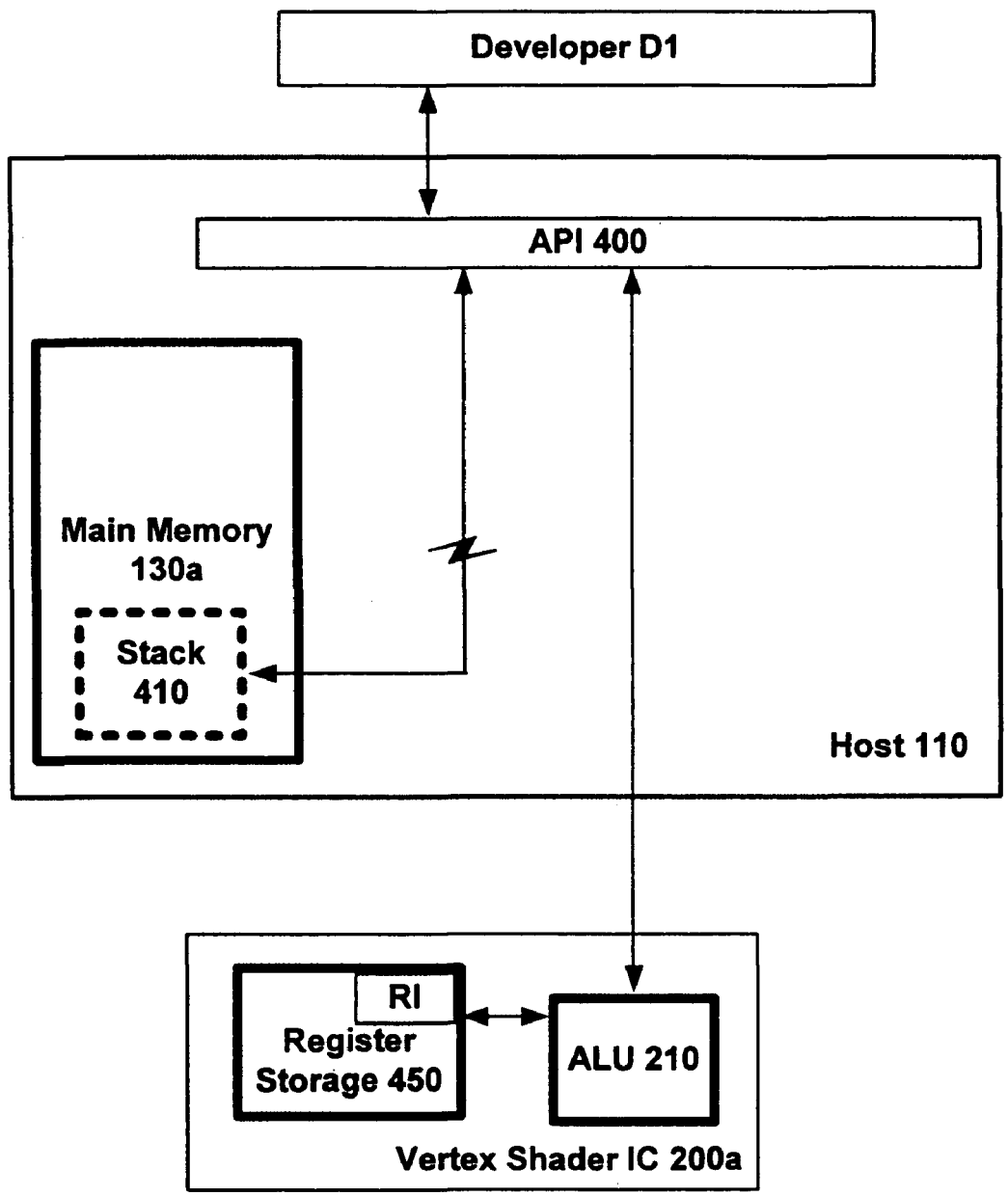
FIG. 4 is a block diagram illustrating a bypassing of host memory resources and the utilization of a register index in accordance with an exemplary API of the present invention.

Similar to the way that RISC architectures define a novel minimal instruction set for processing use, the present invention provides minimal and efficient sets of syntax for unique instructions used in connection with communications of today's vertex and pixel shaders. There are several unique functions that have been expressed for use with such procedural shaders which are of tremendous value in graphics applications to both developers whose coding is greatly simplified and to users of graphics applications that reap the performance benefit. In particular, these procedural shaders do not access main memory or a stack on the host system, but rather perform their operations efficiently with respect to a set of local registers. In accordance with the present invention, an efficient instruction set has been designed to exploit the performance advantages of this architecture. FIG. 4 illustrates the 3-D API 400 of the present invention, whereby there is no requirement to access main memory 130a or stack 410 of host 110 in order to communicate with graphics IC 200 at a register level. Thus, API 400 enables a developer D1 to interface with shader 200 and its associated registers and bypass the relatively slower accessing and processing of data in host memory 130a or stack 410.

Two main improvements with respect to vertex shader communications include the use of an on-chip register index RI and the implementation of a function that returns the fractional portion of floating point number(s) processed at the register level. While the use of indices in connection with mapping to elements stored in host main memory is known, the concept of using an index to map registers of a vertex shader 200a has never been implemented in 3-D hardware. This is an outgrowth of the efficiency of bypassing main memory 130a described above. Today's vertex shader 200a design includes, for example, approximately one hundred registers. In an exemplary implementation, there are 16 input registers, 96 constant registers, 12 temporary registers, 1 address register and output registers corresponding to each rasterizer. These registers are in memory 'banks' or 'files', such as register storage 450. Previously there was no memory accessible inside the vertex shader 200a, and thus the implementation and storage of a register index RI inside the vertex shader 200a is new and advantageous for fast access and local mapping to the elements stored in the registers of the vertex shader 200a.

In a preferred embodiment, the register index RI may be stored in a register file and the register file is utilized in connection with the instructions delivered by API 400 of the present invention. The register index RI is stored in a memory bank that has a counter which points to the appropriate registers for various arguments of instructions that are passed into the vertex shader 200a via API 400. Similarly, the index RI can be placed into an array or any other data structure suitable to mapping arguments to registers for use in processing operations of the vertex shader 200a. Thus, the use of a register index RI inside the vertex shader 200a in accordance with the present invention provides local fast access to vertex shader registers 450, and otherwise improves vertex shader performance. API 400 facilitates the use of the register index RI by providing commands understandable to the graphics board or procedural shader 200, while hiding any particular details regarding addressing and use of the register index RI from the developer.

Furthermore, a special instruction for use in connection with today's vertex shader designs that has never before been implemented as part of a unique set of instructions for a vertex shader language includes the function frc, which takes floating point number(s) as argument(s). As illustrated in FIG. 5A, frc uniquely returns multiple fractional parts of numbers e.g., if presented with 3.14259, it returns 0.14259 effectively truncating off anything to the left of the decimal point. In a preferred embodiment, it, like the other instructions, takes a single 4-element vector input argument and returns a 4-element vector of corresponding fractional parts. Previously, to perform this operation, additional host resources were implicated, and this operation could not leverage the high performance characteristics of direct IC register access.

FIG. 5B illustrates exemplary communications between a 3-D graphics API of a host computing system and a hardware vertex shader with on-chip register storage. At 500, the function frc is called by the API as a result of a developer's or some other code that invokes the functionality of the API. At 510, the instruction and argument data are sent to the vertex shader 200a in a format understood by the vertex shader 200a. At 520, vertex shader 200a carries out the frc function by utilizing on-chip register storage, a processor and an arithmetic/logic unit. In an exemplary embodiment, floating point numbers are utilized in connection with calculations.

Figure 6A:
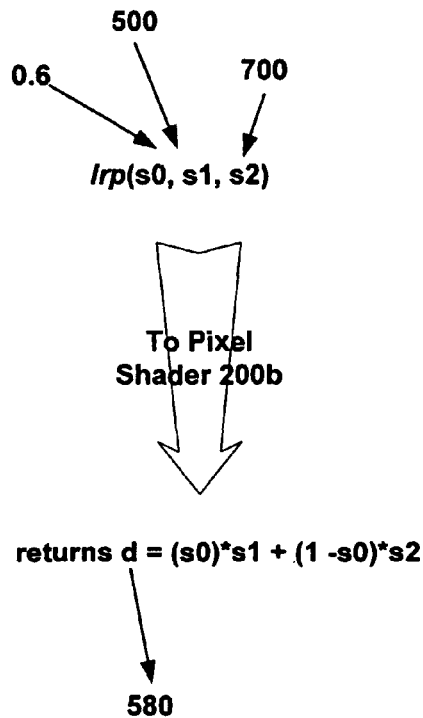
FIG. 6A is a diagram illustrating exemplary communications of a lrp instruction to a pixel shader 200b in accordance with the present invention.

With respect to the improvement of communications with specialized hardware pixel shaders 200b, a special instruction for use in connection with today's pixel shader designs that has never before been implemented as part of a unique set of instructions for a pixel shader language includes the function lrp, which performs a linear interpolation technique. As illustrated in the example of FIG. 6A, the lrp function, taking three inputs or arguments ($s_0$, $s_1$ and $s_2$) and returning one output (d), performs the transformation $d=(s_0)*s_1+(1-s_0)*s_2$ which essentially represents the proportion $s_0$ between $s_1$ and $s_2$, wherein so is between 0 and 1. FIG. 6B is a graphical representation of the exemplary functionality of FIG. 6A, illustrating the computation of point d between s1 and s2. The lrp operation is useful in connection with a myriad of graphics operations, including blend and fade, for example. While previously this operation could be performed by utilizing host processing, and/or through multiple instruction custom coding of a software technique to perform this task, never before has this operation been able to leverage the high performance, register level access characteristics of a hardware pixel shader 200b.

Figure 6C:
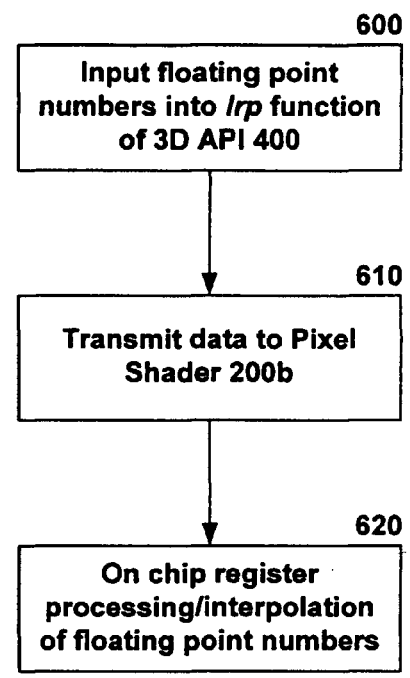
FIG. 6C is a block diagram illustrating an exemplary linear interpolation technique for floating point numbers implemented in connection with a hardware pixel shader in accordance with the present invention.
Figure 6B:
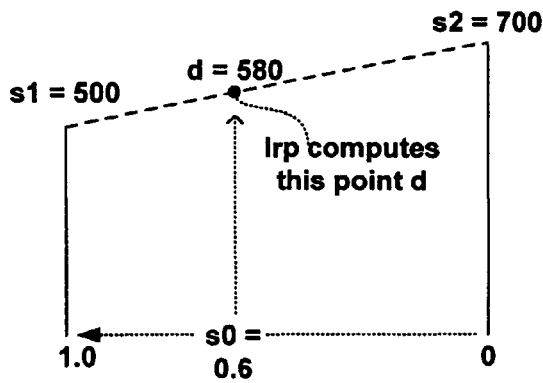
FIG. 6B is a graphical representation of the exemplary communications of a lrp instruction to a pixel shader 200b in accordance with the present invention.

FIG. 6C illustrates exemplary communications between a 3-D graphics API of a host computing system and a hardware pixel shader with on-chip register storage. At 600, the function lrp is called by the API as a result of a developer's or some other code that invokes the functionality of the API. At 610, the instruction and argument data are sent to the pixel shader 200b in a format understood by the pixel shader 200b. At 620, pixel shader 200b carries out the lrp function by utilizing on-chip register storage, a processor and an arithmetic/logic unit. In an exemplary embodiment, floating point numbers are utilized in connection with calculations.

Figures 7A, 7B:
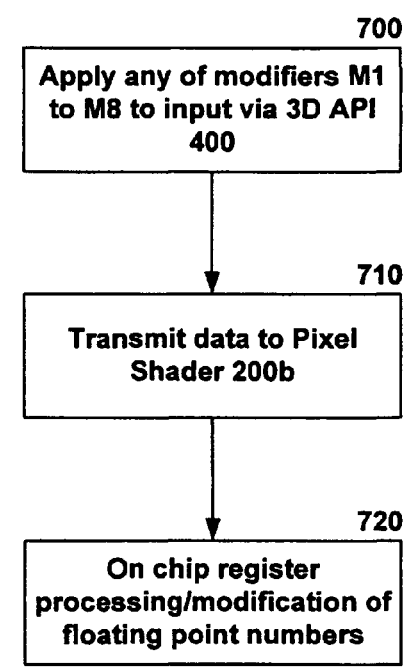
FIG. 7A is a chart labeling exemplary modifier instructions in accordance with the present invention.
FIG. 7B is a block diagram illustrating exemplary modifier techniques for modifying floating point numbers implemented in connection with a hardware pixel shader in accordance with the present invention.

There is also a set of unique modifiers for supporting the various instructions used in connection with pixel shaders 200b. The prior art does not teach the use of modifiers in connection with an instruction set tailored to register level access to hardware pixel shaders 200b. For exemplary modifiers, $-s_1$ negates $s_1$, and $1-s_1$ provides the complement of $s_1$. The modifier_bx2 performs a remap function $y=(x-0.5)*2$ and the modifier_bias provides stick bias i.e., it performs the remap function $y=(x-0.5)$ which takes as an input a number previously between 0 and 1 and centers it between −0.5 and 0.5. Still other operation modifiers include _sat, _x2, _x4 and _d2. _sat is a saturation modifier that clamps a result to the range from 0 to 1. _x2, _x4 and _d2 are scaling modifiers for inputs, whereby the output is scaled by two times, four times, and one-half of the input value, respectively. In short, these are advantageous modifiers in graphics operations, and have sometimes been custom coded by the developer to achieve the desired results. In accordance with the present invention, the above listed modifier techniques can utilize the ultra high speed processing and register storage resident on today's pixel shader IC graphics chips, thereby avoiding the use of costly host processing, or more generally, slower CPU processing. The incorporation of these modifiers into an already specialized pixel shader set of instructions for a hardware pixel shader 200b adds tremendous value from the perspective of ease of development and improved performance. They enable a programmer expecting a software paradigm to have a clear idea of the cost of each instruction executed. This is because in most hardware implementations they are performed in the same logical clock-cycle as an instruction, so representing them to the programmer as separate instructions would make them appear to consume additional clock cycles. As illustrated in FIG. 7A, the special modifier functions of the present invention include negator M1, complementor M2, remapper M3, stick biasor M4, saturation modifier M5 and scalors M6 to M8.

FIG. 7B illustrates exemplary communications between a 3-D graphics API of a host computing system and a hardware pixel shader with on-chip register storage. At 700, a special modifier function is called by the API as a result of a developer's or some other code that invokes the functionality of the API. At 710, the modifier function and argument data are sent to the pixel shader 200b in a format understood by the pixel shader 200b. At 720, pixel shader 200b carries out the special modifier function by utilizing on-chip register storage, a processor and an arithmetic/logic unit. In an exemplary embodiment, floating point numbers are utilized in connection with calculations.

Some exemplary code or definitional pseudocode for a procedural shader, such as a vertex shader, is provided below. The declaration portion of an exemplary procedural shader defines the static external interface of the procedural shader. The information in the declaration includes assignments of vertex shader input registers to data streams. These assignments bind a specific vertex register to a single component within a vertex stream. A vertex stream element is identified by a byte offset within the stream and a type. The type specifies the arithmetic data type plus the dimensionality (1, 2, 3, or 4 values). Stream data that is less than four values are preferably expanded out to four values with zero or more 0.F values and one 1.F value.

The information in the declaration also includes assignment of vertex shader input registers to implicit data from the primitive tessellator. This controls the loading of vertex data which is not loaded from a stream, but rather is generated during primitive tessellation prior to the vertex shader.

Moreover, the information in the declaration also includes loading data into the constant memory at the time a procedural shader is set as the current procedural shader. Each token specifies values for one or more contiguous 4 DWORD constant registers. This allows the procedural shader to update an arbitrary subset of the constant memory, overwriting the device state (which contains the current values of the constant memory). Note that these values can be subsequently overwritten (between DrawPrimitive calls) during the time a procedural shader is bound to a device via the SetVertexShaderConstant method.

Declaration arrays are single-dimensional arrays of DWORDs composed of multiple tokens each of which is one or more DWORDs. The single DWORD token value 0xFFFFFFFF is a special token used to indicate the end of the declaration array. The single DWORD token value 0x00000000 is a NOP token with is ignored during the declaration parsing. Note that 0x00000000 is a valid value for DWORDs following the first DWORD for multiple word tokens.

[31:29] TokenType
0x0—NOP (requires all DWORD bits to be zero)
0x1—stream selector
0x2—stream data definition (map to vertex input memory)
0x3—vertex input memory from tessellator
0x4—constant memory from shader
0x5—extension
0x6—reserved
0x7—end-of-array (requires all DWORD bits to be 1)

NOP Token (Single DWORD Token)
[31:29] 0x0
[28:00] 0x0

Stream Selector (Single DWORD Token)
[31:29] 0x1
[28] indicates whether this is a tessellator stream
[27:04] 0x0
[03:00] stream selector (0 . . . 15)

Stream Data Definition (Single DWORD Token)
Vertex Input Register Load
[31:29] 0x2
[28] 0x0
[27:20] 0x0
[19:16] type (dimensionality and data type)
[15:04] 0x0
[03:00] vertex register address (0 . . . 15)

Data Skip (No Register Load)
[31:29] 0x2
[28] 0x1
[27:20] 0x0
[19:16] count of DWORDS to skip over (0 . . . 15)
[15:00] 0x0

Vertex Input Memory from Tessellator Data (Single DWORD Token)
[31:29] 0x3
[28] indicates whether data is normals or u/v
[27:24] 0x0
[23:20] vertex register address (0 . . . 15)
[19:16] type (dimensionality)
[15:04] 0x0
[03:00] vertex register address (0 . . . 15)

Constant Memory from Shader (Multiple DWORD Token)
[31:29] 0x4
[28:25] count of 4*DWORD constants to load (0 . . . 15)
[24:07] 0x0
[06:00] constant memory address (0 . . . 95)

Extension Token (Single or Multiple DWORD Token)
[31:29] 0x5
[28:24] count of additional DWORDs in token (0.31)
[23:00] extension-specific information End-of-Array Token (Single DWORD Token)
[31:29] 0x7
[28:00] 0x1ffffff The stream selector token is desirably followed by a contiguous set of stream data definition tokens. This token sequence fully defines that stream, including the set of elements within the stream, the order in which the elements appear, the type of each element, and the vertex register into which to load an element.

Streams are allowed to include data which is not loaded into a vertex register, thus allowing data which is not used for this shader to exist in the vertex stream. This skipped data is defined only by a count of DWORDs to skip over, since the type information is irrelevant.

The token Sequence:
Stream Select: stream=0
Stream Data Definition (Load): type=FLOAT3; register=3
Stream Data Definition (Load): type=FLOAT3; register=4
Stream Data Definition (Skip): count=2
Stream Data Definition (Load): type=FLOAT2; register=7 defines stream zero to consist of four elements, three of which are loaded into registers and the fourth skipped over. Register 3 is loaded with the first three DWORDs in each vertex interpreted as FLOAT data. Register 4 is loaded with the fourth, fifth, and sixth DWORDs interpreted as FLOAT data. The next two DWORDs (seventh and eighth) are skipped over and not loaded into any vertex input register. Register 7 is loaded with the ninth and tenth DWORDS interpreted as FLOAT data.

Placing of tokens other than NOPs between the Stream Selector and Stream Data Definition tokens is disallowed.

[28:24] count of additional DWORDs in token (0..31)
[23:00] extension-specific information End-of-array token (single DWORD token)
[31:29] 0x7
[28:00] 0x1fffffff The stream selector token is desirably followed by a contiguous set of stream data definition tokens. This token sequence fully defines that stream, including the set of elements within the stream, the order in which the elements appear, the type of each element, and the vertex register into which to load an element.

Streams are allowed to include data which is not loaded into a vertex register, thus allowing data which is not used for this shader to exist in the vertex stream. This skipped data is defined only by a count of DWORDs to skip over, since the type information is irrelevant.

The token sequence:
Stream Select: stream=0
Stream Data Definition (Load): type=FLOAT3; register=3
Stream Data Definition (Load): type=FLOAT3; register=4
Stream Data Definition (Skip): count=2
Stream Data Definition (Load): type=FLOAT2; register=7 defines stream zero to consist of four elements, three of which are loaded into registers and the fourth skipped over. Register 3 is loaded with the first three DWORDs in each vertex interpreted as FLOAT data. Register 4 is loaded with the fourth, fifth, and sixth DWORDs interpreted as FLOAT data. The next two DWORDs (seventh and eighth) are skipped over and not loaded into any vertex input register. Register 7 is loaded with the ninth and tenth DWORDS interpreted as FLOAT data.

Placing of tokens other than NOPs between the Stream Selector and Stream Data Definition tokens is disallowed.

```
typedef enum _D3DVSD_TOKENTYPE
{
    D3DVSD_TOKEN_NOP      = 0,   // NOP or extension
    D3DVSD_TOKEN_STREAM,          // stream selector
```

```
    D3DVSD_TOKEN_STREAMDATA,    // stream data definition (map to vertex input
memory)
    D3DVSD_TOKEN_TESSELLATOR,   // vertex input memory from tessellator
    D3DVSD_TOKEN_CONSTMEM,      // constant memory from shader
    D3DVSD_TOKEN_EXT,           // extension
    D3DVSD_TOKEN_END = 7,       // end-of-array (requires all DWORD bits to be 1)
    D3DVSD_FORCE_DWORD = 0x7fffffff,// force 32-bit size enum
} D3DVSD_TOKENTYPE;
``` define D3DVSD_TOKENTYPESHIFT  29
define D3DVSD_TOKENTYPEMASK   (7 << D3DVSD_TOKENTYPESHIFT)

define D3DVSD_STREAMNUMBERSHIFT 0
define D3DVSD_STREAMNUMBERMASK (0xF << D3DVSD_STREAMNUMBERSHIFT)

define D3DVSD_DATALOADTYPESHIFT 28
define D3DVSD_DATALOADTYPEMASK (0x1 << D3DVSD_DATALOADTYPESHIFT)

define D3DVSD_DATATYPESHIFT 16
define D3DVSD_DATATYPEMASK (0xF << D3DVSD_DATATYPESHIFT)

define D3DVSD_SKIPCOUNTSHIFT 16
define D3DVSD_SKIPCOUNTMASK (0xF << D3DVSD_SKIPCOUNTSHIFT)

define D3DVSD_VERTEXREGSHIFT 0
define D3DVSD_VERTEXREGMASK (0x1F << D3DVSD_VERTEXREGSHIFT)

define D3DVSD_VERTEXREGINSHIFT 20
define D3DVSD_VERTEXREGINMASK (0xF << D3DVSD_VERTEXREGINSHIFT)

define D3DVSD_CONSTCOUNTSHIFT 25
define D3DVSD_CONSTCOUNTMASK (0xF << D3DVSD_CONSTCOUNTSHIFT)

define D3DVSD_CONSTADDRESSSHIFT 0
define D3DVSD_CONSTADDRESSMASK (0x7F << D3DVSD_CONSTADDRESSSHIFT)

define D3DVSD_CONSTRSSHIFT 16
define D3DVSD_CONSTRSMASK (0x1FFF << D3DVSD_CONSTRSSHIFT)

define D3DVSD_EXTCOUNTSHIFT 24
define D3DVSD_EXTCOUNTMASK (0x1F << D3DVSD_EXTCOUNTSHIFT)

```
#define D3DVSD_EXTINFOSHIFT 0
#define D3DVSD_EXTINFOMASK (0xFFFFFF << D3DVSD_EXTINFOSHIFT)

#define D3DVSD_MAKETOKENTYPE(tokenType) ((tokenType <<
D3DVSD_TOKENTYPESHIFT) & D3DVSD_TOKENTYPEMASK)

// macros for generation of CreateVertexShader Declaration token array

// Set current stream
// _StreamNumber [0..(MaxStreams-1)] stream to get data from
//
#define D3DVSD_STREAM( _StreamNumber ) \
    (D3DVSD_MAKETOKENTYPE(D3DVSD_TOKEN_STREAM) | (_StreamNumber))

// Set tessellator stream
//
#define D3DVSD_STREAMTESSSHIFT 28
#define D3DVSD_STREAMTESSMASK (1 << D3DVSD_STREAMTESSSHIFT)
#define D3DVSD_STREAM_TESS( ) \
    (D3DVSD_MAKETOKENTYPE(D3DVSD_TOKEN_STREAM) |
(D3DVSD_STREAMTESSMASK))

// bind single vertex register to vertex element from vertex stream
//
// _VertexRegister [0..15] address of the vertex register
// _Type [D3DVSDT_*] dimensionality and arithmetic data type define D3DVSD_REG( _VertexRegister, _Type ) \
    (D3DVSD_MAKETOKENTYPE(D3DVSD_TOKEN_STREAMDATA) |         \
    ((_Type) << D3DVSD_DATATYPESHIFT) | (_VertexRegister))

// Skip _DWORDCount DWORDs in vertex
//
#define D3DVSD_SKIP( _DWORDCount ) \
    (D3DVSD_MAKETOKENTYPE(D3DVSD_TOKEN_STREAMDATA) | 0x10000000 | \
    ((_DWORDCount) << D3DVSD_SKIPCOUNTSHIFT))

// load data into vertex shader constant memory
//
// _ConstantAddress [0..95] - address of constant array to begin filling data
// _Count [0..15] - number of constant vectors to load (4 DWORDs each)
// followed by 4*_Count DWORDS of data
```

```
//
#define D3DVSD_CONST( _ConstantAddress, _Count ) \
    (D3DVSD_MAKETOKENTYPE(D3DVSD_TOKEN_CONSTMEM) | \
    ((_Count) << D3DVSD_CONSTCOUNTSHIFT) | (_ConstantAddress))

// enable tessellator generated normals
//
// _VertexRegisterIn [0..15] address of vertex register whose input stream
//                   will be used in normal computation
// _VertexRegisterOut [0..15] address of vertex register to output the normal to
//
#define D3DVSD_TESSNORMAL( _VertexRegisterIn, _VertexRegisterOut ) \
    (D3DVSD_MAKETOKENTYPE(D3DVSD_TOKEN_TESSELLATOR) | \
    ((_VertexRegisterIn) << D3DVSD_VERTEXREGINSHIFT) | \
    ((0x02) << D3DVSD_DATATYPESHIFT) | (_VertexRegisterOut))

// enable tessellator generated surface parameters
//
// _VertexRegister [0..15] address of vertex register to output parameters
//
#define D3DVSD_TESSUV( _VertexRegister ) \
    (D3DVSD_MAKETOKENTYPE(D3DVSD_TOKEN_TESSELLATOR) | 0x10000000 | \
    ((0x01) << D3DVSD_DATATYPESHIFT) | (_VertexRegister))

// Generates END token
//
#define D3DVSD_END() 0xFFFFFFFF

// Generates NOP token
#define D3DVSD_NOP() 0x00000000

// bit declarations for _Type fields
#define D3DVSDT_FLOAT1      0x00   // 1D float expanded to (value, 0., 0., 1.)
#define D3DVSDT_FLOAT2      0x01   // 2D float expanded to (value, value, 0., 1.)
#define D3DVSDT_FLOAT3      0x02   // 3D float expanded to (value, value, value, 1.)
#define D3DVSDT_FLOAT4      0x03   // 4D float
#define D3DVSDT_D3DCOLOR    0x04   // 4D packed unsigned bytes mapped to 0. to 1. range
                                   // Input is in D3DCOLOR format (ARGB)
``` expanded to (R, G, B, A)
```
#define D3DVSDT_UBYTE4    0x05   // 4D unsigned byte
#define D3DVSDT_SHORT2    0x06   // 2D signed short expanded to (value, value, 0., 1.)
define D3DVSDT_SHORT4    0x07   // 4D signed short // assignments of vertex input registers for fixed function vertex shader
//
#define D3DVSDE_POSITION       0
#define D3DVSDE_BLENDWEIGHT    1
#define D3DVSDE_BLENDINDICES   2
#define D3DVSDE_NORMAL         3
#define D3DVSDE_PSIZE          4
#define D3DVSDE_DIFFUSE        5
#define D3DVSDE_SPECULAR       6
#define D3DVSDE_TEXCOORD0      7
#define D3DVSDE_TEXCOORD1      8
#define D3DVSDE_TEXCOORD2      9
#define D3DVSDE_TEXCOORD3      10
#define D3DVSDE_TEXCOORD4      11
#define D3DVSDE_TEXCOORD5      12
#define D3DVSDE_TEXCOORD6      13
#define D3DVSDE_TEXCOORD7      14
#define D3DVSDE_POSITION2      15
#define D3DVSDE_NORMAL2        16

// Maximum supported number of texture coordinate sets
#define D3DDP_MAXTEXCOORD  8

;begin_internal
//---------------------------------------------------------------------
//
// Pixel Shader (PS) & Vertex Shader (VS) Instruction Token Definition
//
// **** Version Token ****
// [07:00] minor version number
// [15:08] major version number
// [31:16]
//   PS 0xFFFF
//   VS 0xFFFE
//
// **** End Token ****
// [31:00] 0x0000FFFF
//
```

```
// **** Comment Token ****
// [15:00] 0xFFFE
// [30:16] DWORD Length (up to 2^15 DWORDS = 128KB)
// [31] 0x0
//
// **** Instruction Token ****
// [15:00] Opcode (D3DSIO_*)
// [23:16] Opcode-Specific Controls
// [29:24] Reserved 0x0
// [30] Co-Issue - if set then execute this instruction with the previous
instruction(s)
// [31] 0x0
//
// **** Destination Parameter Token ****
// [07:00] Register Number (offset in register file)
// [15:08] Reserved 0x0
// [19:16] Write Mask
//   [16] Component 0 (X;Red)
//   [17] Component 1 (Y;Green)
//   [18] Component 2 (Z;Blue)
//   [19] Component 3 (W;Alpha)
// [23:20]
//   PS Result Modifier
//   VS Reserved 0x0
// [27:24]
//   PS Result Shift Scale (signed shift)
//   VS Reserved 0x0
// [30:28] Register Type
//   [0x0] Temporary Register File
//   [0x1] Reserved
//   [0x2] Reserved
//   [0x3]
//     VS Address Register (reg num must be zero)
//     PS Reserved
//   [0x4]
//     VS Rasterizer Output Register File
//     PS Reserved
//   [0x5]
//     VS Attribute Output Register File
//     PS Reserved
//   [0x6]
//     VS Texture Coordinate Register File
//     PS Reserved
//   [0x7] Reserved
```

```
// [31] 0x1
//
// **** Source Parameter Token *****
// [12:00] Register Number (offset in register file)
// [13]
//   VS Relative Address
//   PS Reserved 0x0
// [14:15]
//   VS Relative Address Register Component
//   PS Reserved 0x0
// [23:16] Source Component Swizzle
//   [17:16] Component 0 Swizzle
//   [19:18] Component 1 Swizzle
//   [21:20] Component 2 Swizzle
//   [23:22] Component 3 Swizzle
// [27:24] Source Modifier
//     [0x0] None
//     [0x1] Negate
//     [0x2] Bias
//     [0x3] Bias and Negate
//     [0x4] Sign
//     [0x5] Sign and Negate
//     [0x6] Complement
//     [0x7-0xf] Reserved
// [30:28] Register Type
//     [0x0] Temporary Register File
//     [0x1] Input Register File
//     [0x2] Constant Register File
//     [0x3-0x7] Reserved
// [31] 0x1
//
// The exception for source parameter tokens is with the instruction:
// D3DSIO_DEF c#,f0,f1,f2,f2
// Here, the source parameter tokens (f#) are each taken as 32 bit floats.
//
;end_internal //
// Instruction Token Bit Definitions
//
define D3DSI_OPCODE_MASK     0x0000FFFF typedef enum _D3DSHADER_INSTRUCTION_OPCODE_TYPE
{
```

```
D3DSIO_NOP       = 0,   // PS/VS
D3DSIO_MOV         ,    // PS/VS
D3DSIO_ADD         ,    // PS/VS
D3DSIO_SUB         ,    // PS
D3DSIO_MAD         ,    // PS/VS
D3DSIO_MUL         ,    // PS/VS
D3DSIO_RCP         ,    // VS
D3DSIO_RSQ         ,    // VS
D3DSIO_DP3         ,    // PS/VS
D3DSIO_DP4         ,    // PS/VS
D3DSIO_MIN         ,    // VS
D3DSIO_MAX         ,    // VS
D3DSIO_SLT         ,    // VS
D3DSIO_SGE         ,    // VS
D3DSIO_EXP         ,    // VS
D3DSIO_LOG         ,    // VS
D3DSIO_LIT         ,    // VS
D3DSIO_DST         ,    // VS
D3DSIO_LRP         ,    // PS
D3DSIO_FRC         ,    // VS
D3DSIO_M4x4        ,    // VS
D3DSIO_M4x3        ,    // VS
D3DSIO_M3x4        ,    // VS
D3DSIO_M3x3        ,    // VS
D3DSIO_M3x2        ,    // VS

D3DSIO_TEXCOORD  = 64,  // PS
D3DSIO_TEXKILL     ,    // PS
D3DSIO_TEX         ,    // PS
D3DSIO_TEXBEM      ,    // PS
D3DSIO_TEXBEML     ,    // PS
D3DSIO_TEXREG2AR   ,    // PS
D3DSIO_TEXREG2GB   ,    // PS
D3DSIO_TEXM3x2PAD  ,    // PS
D3DSIO_TEXM3x2TEX  ,    // PS
D3DSIO_TEXM3x3PAD  ,    // PS
D3DSIO_TEXM3x3TEX  ,    // PS
D3DSIO_TEXM3x3DIFF ,    // PS
D3DSIO_TEXM3x3SPEC ,    // PS
D3DSIO_TEXM3x3VSPEC,    // PS
D3DSIO_EXPP        ,    // VS
D3DSIO_LOGP        ,    // VS
D3DSIO_CND         ,    // PS
D3DSIO_DEF         ,    // PS
```

```
;begin_internal
    D3DSIO_RESERVED0    = 96,    // PS
    D3DSIO_RESERVED1    ,        // PS
    D3DSIO_RESERVED2    ,        // PS
    D3DSIO_RESERVED3    ,        // PS
;end_internal
    D3DSIO_COMMENT      = 0xFFFE,
    D3DSIO_END          = 0xFFFF, D3DSIO_FORCE_DWORD  = 0x7fffffff,  // force 32-bit size enum
} D3DSHADER_INSTRUCTION_OPCODE_TYPE;

//
// Co-Issue Instruction Modifier - if set then this instruction is to be
// issued in parallel with the previous instruction(s) for which this bit
// is not set.
//
#define D3DSI_COISSUE        0x40000000

//
// Parameter Token Bit Definitions
//
define D3DSP_REGNUM_MASK    0x00000FFF // destination parameter write mask
define D3DSP_WRITEMASK_0    0x00010000  // Component 0 (X;Red)
#define D3DSP_WRITEMASK_1    0x00020000  // Component 1 (Y;Green)
#define D3DSP_WRITEMASK_2    0x00040000  // Component 2 (Z;Blue)
#define D3DSP_WRITEMASK_3    0x00080000  // Component 3 (W;Alpha)
define D3DSP_WRITEMASK_ALL  0x000F0000  // All Components // destination parameter modifiers
define D3DSP_DSTMOD_SHIFT   20
define D3DSP_DSTMOD_MASK    0x00F00000 typedef enum _D3DSHADER_PARAM_DSTMOD_TYPE
{
    D3DSPDM_NONE      = 0<<D3DSP_DSTMOD_SHIFT, // nop
    D3DSPDM_SATURATE  = 1<<D3DSP_DSTMOD_SHIFT, // clamp to 0. to 1. range
    D3DSPDM_FORCE_DWORD = 0x7fffffff,    // force 32-bit size enum
} D3DSHADER_PARAM_DSTMOD_TYPE;

// destination parameter shift
#define D3DSP_DSTSHIFT_SHIFT   24
```

```
#define D3DSP_DSTSHIFT_MASK   0x0F000000

// destination/source parameter register type
#define D3DSP_REGTYPE_SHIFT   28
define D3DSP_REGTYPE_MASK    0x70000000 typedef enum _D3DSHADER_PARAM_REGISTER_TYPE
{
   D3DSPR_TEMP    = 0<<D3DSP_REGTYPE_SHIFT, // Temporary Register File
   D3DSPR_INPUT   = 1<<D3DSP_REGTYPE_SHIFT, // Input Register File
   D3DSPR_CONST   = 2<<D3DSP_REGTYPE_SHIFT, // Constant Register File
   D3DSPR_ADDR    = 3<<D3DSP_REGTYPE_SHIFT, // Address Register (VS)
   D3DSPR_TEXTURE = 3<<D3DSP_REGTYPE_SHIFT, // Texture Register File (PS)
   D3DSPR_RASTOUT = 4<<D3DSP_REGTYPE_SHIFT, // Rasterizer Register File
   D3DSPR_ATTROUT = 5<<D3DSP_REGTYPE_SHIFT, // Attribute Output Register File
   D3DSPR_TEXCRDOUT= 6<<D3DSP_REGTYPE_SHIFT, // Texture Coordinate Output Register File
   D3DSPR_FORCE_DWORD = 0x7fffffff,    // force 32-bit size enum
} D3DSHADER_PARAM_REGISTER_TYPE;

// Register offsets in the Rasterizer Register File
//
typedef enum _D3DVS_RASTOUT_OFFSETS
{
   D3DSRO_POSITION = 0,
   D3DSRO_FOG,
   D3DSRO_POINT_SIZE,
   D3DSRO_FORCE_DWORD = 0x7fffffff,    // force 32-bit size enum
} D3DVS_RASTOUT_OFFSETS;

// Source operand addressing modes define D3DVS_ADDRESSMODE_SHIFT 13
define D3DVS_ADDRESSMODE_MASK  (1 << D3DVS_ADDRESSMODE_SHIFT)

typedef enum _D3DVS_ADDRESSMODE_TYPE
{
   D3DVS_ADDRMODE_ABSOLUTE = (0 << D3DVS_ADDRESSMODE_SHIFT),
   D3DVS_ADDRMODE_RELATIVE = (1 << D3DVS_ADDRESSMODE_SHIFT), // Relative to register A0
   D3DVS_ADDRMODE_FORCE_DWORD = 0x7fffffff, // force 32-bit size enum
} D3DVS_ADDRESSMODE_TYPE;
```

```
// Source operand swizzle definitions
//
#define D3DVS_SWIZZLE_SHIFT    16
#define D3DVS_SWIZZLE_MASK     0x00FF0000

// The following bits define where to take component X:

#define D3DVS_X_X    (0 << D3DVS_SWIZZLE_SHIFT)
#define D3DVS_X_Y    (1 << D3DVS_SWIZZLE_SHIFT)
#define D3DVS_X_Z    (2 << D3DVS_SWIZZLE_SHIFT)
#define D3DVS_X_W    (3 << D3DVS_SWIZZLE_SHIFT)

// The following bits define where to take component Y:

#define D3DVS_Y_X    (0 << (D3DVS_SWIZZLE_SHIFT + 2))
#define D3DVS_Y_Y    (1 << (D3DVS_SWIZZLE_SHIFT + 2))
#define D3DVS_Y_Z    (2 << (D3DVS_SWIZZLE_SHIFT + 2))
#define D3DVS_Y_W    (3 << (D3DVS_SWIZZLE_SHIFT + 2))

// The following bits define where to take component Z:

#define D3DVS_Z_X    (0 << (D3DVS_SWIZZLE_SHIFT + 4))
#define D3DVS_Z_Y    (1 << (D3DVS_SWIZZLE_SHIFT + 4))
#define D3DVS_Z_Z    (2 << (D3DVS_SWIZZLE_SHIFT + 4))
#define D3DVS_Z_W    (3 << (D3DVS_SWIZZLE_SHIFT + 4))

// The following bits define where to take component W:

#define D3DVS_W_X    (0 << (D3DVS_SWIZZLE_SHIFT + 6))
#define D3DVS_W_Y    (1 << (D3DVS_SWIZZLE_SHIFT + 6))
#define D3DVS_W_Z    (2 << (D3DVS_SWIZZLE_SHIFT + 6))
#define D3DVS_W_W    (3 << (D3DVS_SWIZZLE_SHIFT + 6))

// Value when there is no swizzle (X is taken from X, Y is taken from Y,
// Z is taken from Z, W is taken from W
//
#define D3DVS_NOSWIZZLE (D3DVS_X_X | D3DVS_Y_Y | D3DVS_Z_Z | D3DVS_W_W)

// source parameter swizzle
#define D3DSP_SWIZZLE_SHIFT    16
#define D3DSP_SWIZZLE_MASK     0x00FF0000
```

```
#define D3DSP_NOSWIZZLE \
    ( (0 << (D3DSP_SWIZZLE_SHIFT + 0)) | \
      (1 << (D3DSP_SWIZZLE_SHIFT + 2)) | \
      (2 << (D3DSP_SWIZZLE_SHIFT + 4)) | \
      (3 << (D3DSP_SWIZZLE_SHIFT + 6)) )

// pixel-shader swizzle ops
#define D3DSP_REPLICATEALPHA \
    ( (3 << (D3DSP_SWIZZLE_SHIFT + 0)) | \
      (3 << (D3DSP_SWIZZLE_SHIFT + 2)) | \
      (3 << (D3DSP_SWIZZLE_SHIFT + 4)) | \
      (3 << (D3DSP_SWIZZLE_SHIFT + 6)) )

// source parameter modifiers
#define D3DSP_SRCMOD_SHIFT    24
define D3DSP_SRCMOD_MASK     0x0F000000 typedef enum _D3DSHADER_PARAM_SRCMOD_TYPE
{
    D3DSPSM_NONE    = 0<<D3DSP_SRCMOD_SHIFT, // nop
    D3DSPSM_NEG     = 1<<D3DSP_SRCMOD_SHIFT, // negate
    D3DSPSM_BIAS    = 2<<D3DSP_SRCMOD_SHIFT, // bias
    D3DSPSM_BIASNEG = 3<<D3DSP_SRCMOD_SHIFT, // bias and negate
    D3DSPSM_SIGN    = 4<<D3DSP_SRCMOD_SHIFT, // sign
    D3DSPSM_SIGNNEG = 5<<D3DSP_SRCMOD_SHIFT, // sign and negate
    D3DSPSM_COMP    = 6<<D3DSP_SRCMOD_SHIFT, // complement
    D3DSPSM_FORCE_DWORD = 0x7fffffff,        // force 32-bit size enum
} D3DSHADER_PARAM_SRCMOD_TYPE;

// pixel shader version token
#define D3DPS_VERSION(_Major,_Minor) (0xFFFF0000|((_Major)<<8)|(_Minor))

// vertex shader version token
#define D3DVS_VERSION(_Major,_Minor) (0xFFFE0000|((_Major)<<8)|(_Minor))

// extract major/minor from version cap
#define D3DSHADER_VERSION_MAJOR(_Version) (((_Version)8)&0xFF)
#define D3DSHADER_VERSION_MINOR(_Version) (((_Version)0)&0xFF)

// destination/source parameter register type
#define D3DSI_COMMENTSIZE_SHIFT    16
#define D3DSI_COMMENTSIZE_MASK     0x7FFF0000
#define D3DSHADER_COMMENT(_DWordSize) \
```

((((_DWordSize)<<D3DSI_COMMENTSIZE_SHIFT)&D3DSI_COMMENTSIZE_MASK)|
D3DSIO_COMMENT)

```
// pixel/vertex shader end token
#define D3DPS_END() 0x0000FFFF
#define D3DVS_END() 0x0000FFFF
```

While the above exemplary computer-executable instructions have been described in the context of a procedural shader, these concepts and principles may be applied to any 3D hardware rendering device utilized in connection with a graphics display system.

The term graphics data as used herein is intended to cover not only video and/or audio data in any pre-processed, processed or compressed form, but is additionally intended to cover communications of data of any kind along the graphics pipeline among the developer, the software interface of the present invention and various hardware and/or software components utilized incident to the graphics system.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and nonvolatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. One skilled in the art will recognize that the present invention is not limited to the hardware pixel shader and vertex shader designs illustrated and described above, but rather the invention applies to the incorporation of specialized syntax and novel functionality into an API for communicating with any ultra high performance graphics hardware chips that have register level processing. In such circumstances and according to the present invention, the functions, syntax and the desirability of their use remains applicable. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method, comprising:
   providing a hardware rendering device having on-chip register storage;
   communicating at least one instruction from a host computing system to said hardware rendering device, wherein said host computing system has a main memory and having stored thereon a 3-D API, and wherein said at least one instruction has at least one graphics data argument formatted for the register storage of said hardware rendering device;
   receiving at least one instruction with said hardware rendering device;
   processing with the hardware rendering device processes said at least one graphics data argument incident to the performance of said at least one instruction without accessing the main memory of the host computing system and said hardware rendering device outputs the result of the processing, wherein said at least one instruction is an instruction with at least one floating point number argument and said hardware rendering device outputs the fractional portion of said at least one floating point number; and
   outputting with said hardware rendering device four fractional portions of corresponding four floating point number arguments.

2. The method of claim 1, wherein said at least one graphics data argument is formatted to be remapped to the register state of register storage.

3. The method of claim 1, wherein said at least one instruction is communicated directly to said hardware rendering device and the main memory stack of the host computing system is bypassed.

4. The method of claim 1, wherein incident to the processing of said at least one graphics data argument, the hardware rendering device performs at least one of reading from and writing to on-chip register storage.

5. The method of claim 1, wherein said hardware rendering device further comprises a register index stored in the on-chip register storage.

6. The method of claim 5, wherein the register index stored in the on-chip register storage is accessed pursuant to said at least one instruction and another register is located for use in connection with carrying out said at least one instruction.

7. The method of claim 1, wherein said hardware rendering device further includes a processor and an arithmetic/logic unit.

8. The method of claim 1, wherein said at least one instruction is an instruction with a plurality of floating point number arguments and said hardware rendering device processes the plurality of floating point number arguments to calculate a linear interpolation number representative of a linear interpolation between two of the floating point number arguments and wherein said hardware rendering device outputs said linear interpolation number.

9. The method of claim 1, wherein said at least one instruction includes a special modifier function to be performed during processing by the hardware rendering device.

10. The method of claim 9, wherein said special modifier function performed during said processing by the hardware rendering device is at least one of a negating modifier, complementing modifier, remapping modifier, stick biasing modifier, saturating modifier and scaling modifier.

11. A computer-readable medium having computer-executable instructions, wherein the computer-executable instructions perform:

provide a hardware rendering device having on-chip register storage;

communicating at least one instruction from a host computing system to said hardware rendering device, wherein said host computing system has a main memory and having stored thereon a 3-D API, and wherein said at least one instruction has at least one graphics data argument formatted for the register storage of said hardware rendering device;

receiving at least one instruction with said hardware rendering device;

processing with the hardware rendering device processes said at least one graphics data argument incident to the performance of said at least one instruction without accessing the main memory of the host computing system and said hardware rendering device outputs the result of the processing, wherein said at least one instruction is an instruction with at least one floating point number argument and said hardware rendering device outputs the fractional portion of said at least one floating point number; and outputting with said hardware rendering device four fractional portions of corresponding four floating point number arguments.

12. The computer-readable medium of claim 11, wherein said at least one graphics data argument is formatted to be remapped to the register state of register storage.

13. The computer-readable medium of claim 11, wherein said at least one instruction is communicated directly to said hardware rendering device and the main memory stack of the host computing system is bypassed.

14. The computer-readable medium of claim 11, wherein incident to the processing of said at least one graphics data argument, the hardware rendering device performs at least one of reading from and writing to on-chip register storage.

15. The computer-readable medium of claim 11, wherein said hardware rendering device further comprises a register index stored in the on-chip register storage.

16. The computer-readable medium of claim 15, wherein the register index stored in the on-chip register storage is accessed pursuant to said at least one instruction and another register is located for use in connection with carrying out said at least one instruction.

17. The computer-readable medium of claim 11, wherein said hardware rendering device further includes a processor and an arithmetic/logic unit.

18. The computer-readable medium of claim 11, wherein said at least one instruction is an instruction with a plurality of floating point number arguments and said hardware rendering device processes the plurality of floating point number arguments to calculate a linear interpolation number representative of a linear interpolation between two of the floating point number arguments and wherein said hardware rendering device outputs said linear interpolation number.

19. The computer-readable medium of claim 11, wherein said at least one instruction includes a special modifier function to be performed during processing by the hardware rendering device.

20. The computer-readable medium of claim 19, wherein said special modifier function performed during said processing by the hardware rendering device is at least one of a negating modifier, complementing modifier, remapping modifier, stick biasing modifier, saturating modifier and scaling modifier.

* * * * *